(12) United States Patent
Greenstein

(10) Patent No.: US 6,966,576 B1
(45) Date of Patent: Nov. 22, 2005

(54) AIRBAG RESTRAINT SYSTEM

(76) Inventor: Vincent M. Greenstein, 43415 20th St. W. #20, Lancaster, CA (US) 93535

( * ) Notice: Subject to any disclaimer, the term of this patent is extended or adjusted under 35 U.S.C. 154(b) by 84 days.

(21) Appl. No.: 10/358,723

(22) Filed: Feb. 5, 2003

(51) Int. Cl.$^7$ ............................................. B60R 21/22
(52) U.S. Cl. ................................... 280/730.1; 280/737
(58) Field of Search ......................... 280/730.1, 730.2, 280/737, 729, 733

(56) References Cited

U.S. PATENT DOCUMENTS

| | | | |
|---|---|---|---|
| 5,072,966 A | 12/1991 | Nishitake et al. | |
| 5,172,790 A | 12/1992 | Ishikawa et al. | |
| 5,222,761 A | 6/1993 | Kaji et al. | |
| 5,470,103 A | * 11/1995 | Vaillancourt et al. | .... 280/730.1 |
| 5,507,519 A | * 4/1996 | Schettler-Kohler | ....... 280/730.1 |
| 5,906,395 A | * 5/1999 | Isaji et al. | ............... 280/743.1 |
| D424,010 S | 5/2000 | Wheeler | |
| 6,062,596 A | * 5/2000 | Boydston et al. | ........... 280/733 |
| 6,220,623 B1 | 4/2001 | Yokota | |
| 6,220,625 B1 | 4/2001 | Wallner | |
| 6,502,856 B1 | * 1/2003 | Shaklik et al. | .............. 280/735 |

FOREIGN PATENT DOCUMENTS

JP 5-208647 * 8/1993 .............. 280/730.2

* cited by examiner

Primary Examiner—Eric Culbreth

(57) ABSTRACT

A airbag restraint system for inhibiting passengers in bucket seats from colliding with one another during an accident. The airbag restraint system includes a housing member being designed for being coupled to an interior of the vehicle whereby the housing member is positioned between the bucket seats. An inflation assembly is positioned in the housing member and is operationally coupled to the vehicle. An airbag member is operationally coupled to the inflation assembly. The airbag member is positioned in the housing when the airbag member is deflated. The inflation assembly inflates the airbag member whereby the airbag member extends from the housing member when the inflation assembly is actuated by an accident. The airbag member is designed for extending between the bucket seats to inhibit collision of the passengers with each other.

7 Claims, 4 Drawing Sheets

AIRBAG RESTRAINT SYSTEM

BACKGROUND OF THE INVENTION

1. Field of the Invention

The present invention relates to airbag systems and more particularly pertains to a new airbag restraint system for inhibiting passengers in bucket seats from colliding with one another during an accident.

2. Description of the Prior Art

The use of airbag systems is known in the prior art. U.S. Pat. No. 5,172,790 describes a system for controlling the deploying of airbags in a vehicle. Another type of airbag systems is U.S. Pat. No. 5,222,761 having an airbag restraint system for deploying airbags to protect passengers during an impact into the side of the vehicle. U.S. Pat. No. 6,220,625 has an apparatus that deploys between the side of a vehicle and the passengers to inhibit impact of the passengers with the side of the vehicle. U.S. Pat. No. 6,620,623 has a side airbag device for deploying between a passenger and a side of the vehicle to inhibit impact of the passenger with the vehicle. U.S. Pat. No. 5,072,966 has an energy absorbing structure positioned in the side of the vehicle and deploys during a collision to inhibit contact between the side of the vehicle and the passenger adjacent to the structure.

SUMMARY OF THE INVENTION

An object of the present invention is to provide a new airbag restraint system that protects passengers in bucket seats from colliding with one another during an accident.

Even still another object of the present invention is to provide a new airbag restraint system that may be positioned on the roof or floor of the vehicle to accommodate different configurations of vehicles.

To this end, the present invention generally comprises a housing member being designed for being coupled to an interior of the vehicle whereby the housing member is positioned between the bucket seats. An inflation assembly is positioned in the housing member. The inflation assembly is designed for being operationally coupled to the vehicle whereby the inflation assembly is actuated when the vehicle is involved in the accident. An airbag member is operationally coupled to the inflation assembly. The airbag member is positioned in the housing when the airbag member is deflated. The inflation assembly inflates the airbag member whereby the airbag member extends from the housing member when the inflation assembly is actuated by an accident. The airbag member is designed for extending between the bucket seats to inhibit collision of the passengers with each other. The airbag member comprises height whereby the height of the airbag member positions the airbag between the upper body of each of the passengers to inhibit collision of the passengers with each other during an accident.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
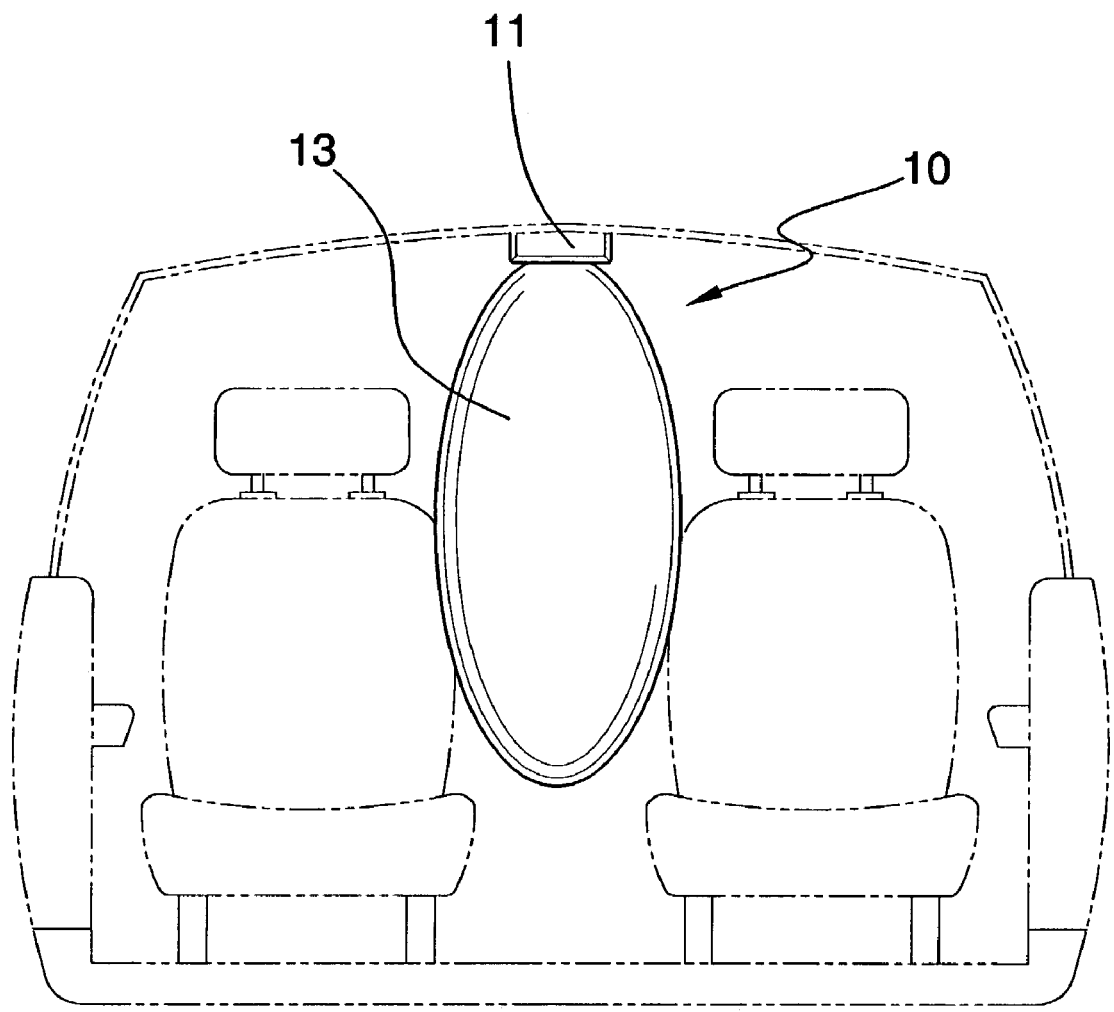
FIG. 1 is a front view of a new airbag restraint system according to the present invention shown in use from the ceiling of the vehicle.

With reference now to the drawings, and in particular to FIGS. 1 through 4 thereof, a new airbag restraint system embodying the principles and concepts of the present invention and generally designated by the reference numeral 10 will be described.

Figure 2:
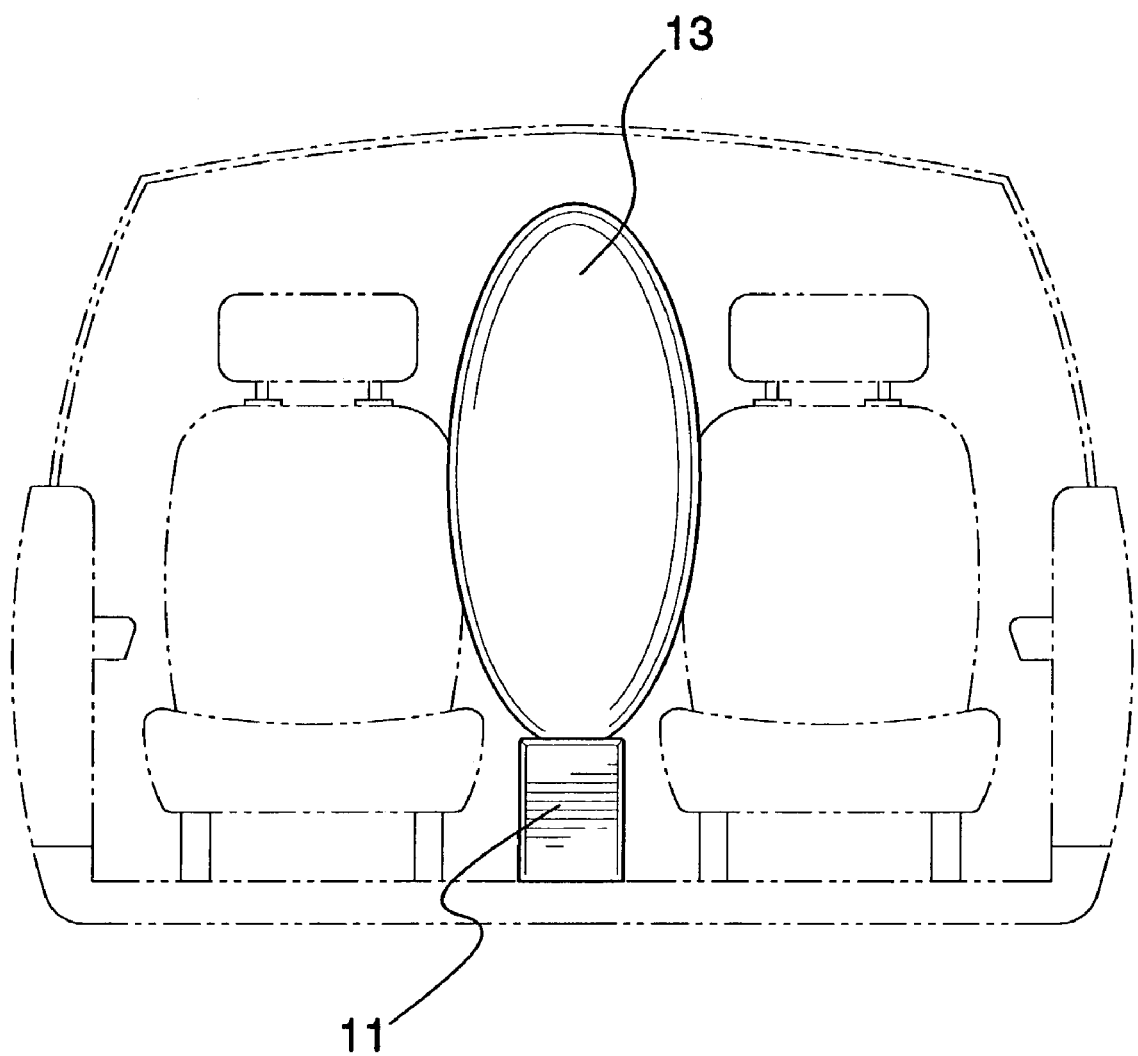
FIG. 2 is a front view of the present invention shown in use from the floor of the vehicle.
Figure 3:
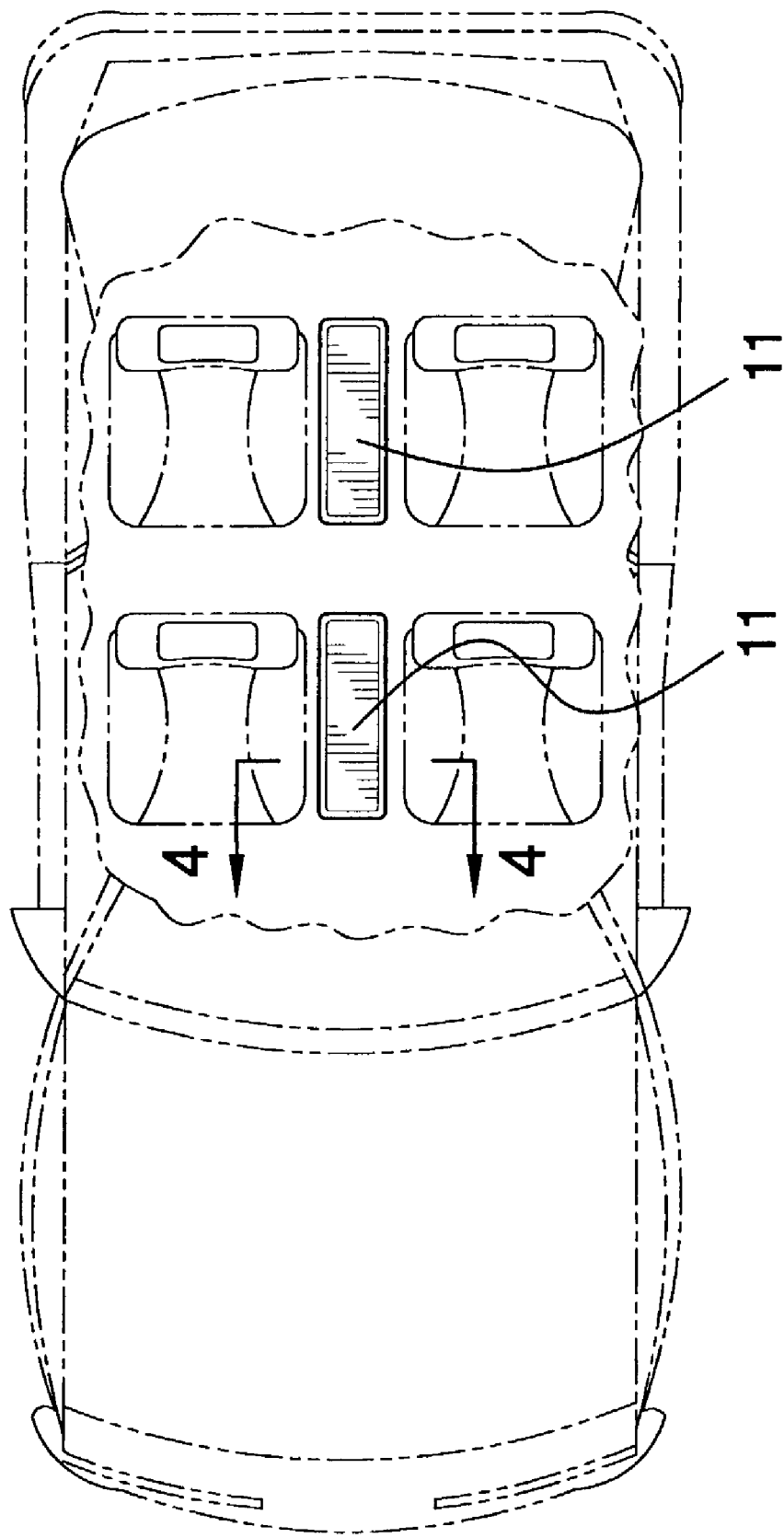
FIG. 3 is a top view of the present invention.
Figure 4:
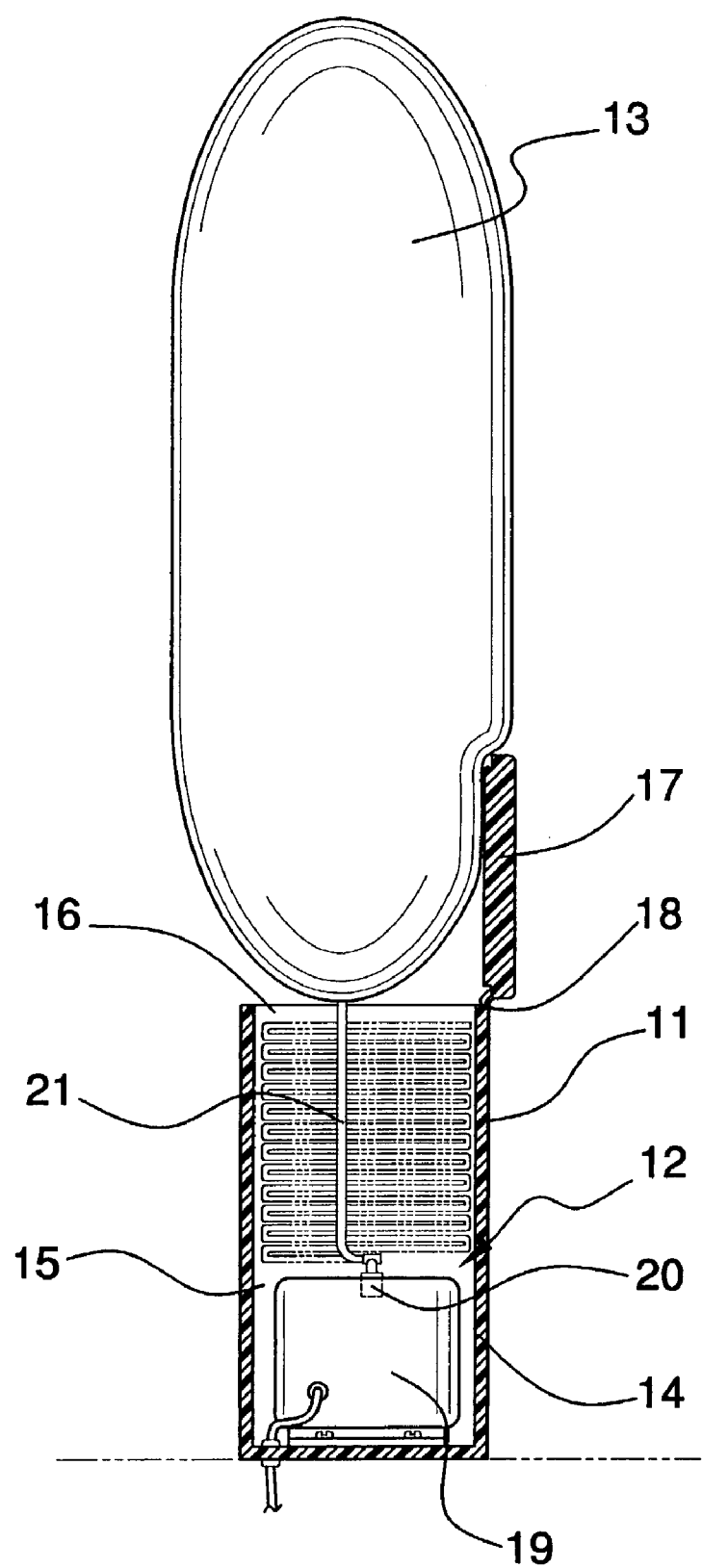
FIG. 4 is a cross-sectional view of the present invention taken along line 4—4 of FIG. 3.

As best illustrated in FIGS. 1 through 4, the airbag restraint system 10 generally comprises a housing member 11 being designed for being coupled to an interior of the vehicle whereby the housing member 11 is positioned between the bucket seats. The housing member 11 may be coupled to the ceiling, as shown in FIG. 1, or to the floor, as shown in FIGS. 2 through 4.

An inflation assembly 12 is positioned in the housing member 11. The inflation assembly 12 is designed for being operationally coupled to the vehicle whereby the inflation assembly 12 is actuated when the vehicle is involved in the accident.

An airbag member 13 is operationally coupled to the inflation assembly 12. The airbag member 13 is positioned in the housing when the airbag member 13 is deflated. The inflation assembly 12 inflates the airbag member 13 whereby the airbag member 13 extends from the housing member 11 when the inflation assembly 12 is actuated by an accident. The airbag member 13 is designed for extending between the bucket seats to inhibit collision of the passengers with each other. The airbag member 13 comprises height whereby the height of the airbag member 13 positions the airbag between the upper body of each of the passengers to inhibit collision of the passengers with each other during an accident.

The housing member 11 comprises a perimeter wall 14. The perimeter wall 14 defines an interior space 15 of the housing member 11. The interior space 15 of the housing member 11 comprises an open end 16 whereby the open end 16 permits the airbag member 13 to extend from the interior space 15 of the housing member 11 when the airbag member 13 is inflated by the inflation assembly 12. The inflation assembly 12 is positioned in the interior space 15 of the housing member 11.

The housing member 11 comprises a lid portion 17. The lid portion 17 is hingably coupled to the perimeter wall 14 whereby the lid portion 17 is positioned adjacent the open end 16 of the interior space 15. The lid portion 17 is positioned over the open end 16 to inhibit damage to the airbag member 13 when the airbag member 13 is positioned in the interior space 15 of the housing member 11. The lid portion 17 pivots away from the open end 16 of the interior space 15 to allow the airbag member 13 to extend from the housing member 11 when the airbag member 13 is inflated by the inflation assembly 12.

The lid portion 17 of the housing member 11 comprises a shoulder 18. The shoulder 18 extends around a perimeter of the lid portion 17 whereby the shoulder 18 permits a portion of the lid portion 17 to be positioned in the open end 16 of the interior space 15 to inhibit the lid portion 17 from shifting with respect to the perimeter wall 14 of the housing member 11 when the lid portion 17 is positioned over the open end 16 of the interior space 15.

The inflation assembly 12 comprises a tank member 19. The tank member 19 is operationally coupled to the airbag member 13. The tank member 19 is designed for storing a gas in a compressed state to inflate the airbag member 13 when the inflation assembly 12 is actuated by an impact of the vehicle.

The inflation assembly 12 comprises a valve member 20. The valve member 20 is operationally coupled between the tank member 19 and the airbag member 13. The valve member 20 is designed for being operationally coupled to the vehicle whereby the valve member 20 releases the gas from the tank member 19 into the airbag member 13 when the valve member 20 is actuated by the vehicle during an accident.

The inflation assembly 12 comprises a hose member 21. The hose member 21 is operationally coupled between the tank member 19 and the airbag member 13 whereby the hose member 21 is for providing fluid communication between the tank member 19 and the airbag member 13.

In use, the housing member 11 is installed in the interior of the vehicle so that the housing member 11 is positioned between a pair of bucket seats of the vehicle. The inflation assembly 12 is then installed into the interior space 15 of the housing member 11. The inflation assembly 12 is operationally coupled to the vehicle, such as the battery and an impact sensor, to actuate the inflation assembly 12 when the vehicle is involved in an accident. The airbag member 13 is then operationally coupled to the inflation assembly 12 and packed into the interior space 15 of the housing member 11. During an accident the inflation assembly 12 is actuated and inflates the airbag member 13 which forces the lid portion 17 of the housing member 11 open and the airbag member 13 extends from the housing member 11. The airbag member 13 is positioned between the head and upper torso of one of the passengers and the head and upper torso of the other passenger so that the airbag member 13 prevents one of the passengers from colliding the other of the passengers in the bucket seats.

With respect to the above description then, it is to be realized that the optimum dimensional relationships for the parts of the invention, to include variations in size, materials, shape, form, function and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An airbag restraint system for inhibiting collision of passengers positioned in bucket seats of a vehicle with each other during an accident, the airbag restraint system comprising:
    a housing member being adapted for being coupled to an interior of the vehicle such that said housing member is positioned between the bucket seats;
    an inflation assembly being positioned in said housing member, said inflation assembly being adapted for being operationally coupled to the vehicle such that said inflation assembly is actuated when the vehicle is involved in the accident; and
    an airbag member being operationally coupled to said inflation assembly, said airbag member being positioned in said housing member when said airbag member is deflated, said inflation assembly inflating said airbag member such that said airbag member extends from said housing member when said inflation assembly is actuated by an accident, said airbag member being adapted for extending between the bucket seats to inhibit collision of the passengers with each other, said airbag member comprising a height such that said height of said airbag member positions said airbag member between the upper body of each of the passengers to inhibit collision of the passengers with each other during an accident;
    said inflation assembly comprising a tank member, said tank member being operationally coupled to said airbag member, said tank member being adapted for storing a gas in a compressed state to inflate said airbag member when said inflation assembly is actuated by an impact of the vehicle;
    said inflation assembly comprising a hose member, said hose member being operationally coupled between said tank member and said airbag member such that said hose member is for providing fluid communication between said tank member and said airbag member.

2. The airbag restraint system as set forth in claim 1, further comprising:
    said housing member comprising a perimeter wall, said perimeter wall defining an interior space of said housing member, said interior space of said housing member comprising an open end such that said open end permits said airbag member to extend from said interior space of said housing member when said airbag member is inflated by said inflation assembly, said inflation assembly being positioned in said interior space of said housing member.

3. The airbag restraint system as set forth in claim 2, further comprising:
    said housing member comprising a lid portion, said lid portion being hingably coupled to said perimeter wall such that said lid portion is positioned adjacent said open end of said housing member, said lid portion being positioned over said open end to inhibit damage to said airbag member when said airbag member is positioned in said interior space of said housing member, said lid portion pivoting away from said open end of said interior space to allow said airbag member to extend from said housing member when said airbag member is inflated by said inflation assembly.

4. The airbag restraint system as set forth in claim 3, further comprising:
    said lid portion of said housing member comprising a shoulder, said shoulder extending around a perimeter of said lid portion such that said shoulder permits a portion of said lid portion to be positioned in said open end of said housing member to inhibit said lid portion from shifting with respect to said perimeter wall of said housing member when said lid portion is positioned over said open end of said interior space.

5. The airbag restraint system as set forth in claim 1, further comprising:
said inflation assembly comprising a valve member, said valve member being operationally coupled between said tank member and said airbag member, said valve member being adapted for being operationally coupled to the vehicle such that said valve member releases the gas from said tank member into said airbag member when said valve member is actuated by the vehicle during an accident.

6. An airbag restraint system for inhibiting collision of passengers positioned in bucket seats of a vehicle with each other during an accident, the airbag restraint system comprising:
a housing member being adapted for being coupled to an interior of the vehicle such that said housing member is positioned between the bucket seats;
an inflation assembly being positioned in said housing member, said inflation assembly being adapted for being operationally coupled to the vehicle such that said inflation assembly is actuated when the vehicle is involved in the accident;
an airbag member being operationally coupled to said inflation assembly, said airbag member being positioned in said housing member when said airbag member is deflated, said inflation assembly inflating said airbag member such that said airbag member extends from said housing member when said inflation assembly is actuated by an accident, said airbag member being adapted for extending between the bucket seats to inhibit collision of the passengers with each other, said airbag member comprising a height such that said height of said airbag member positions said airbag member between the upper body of each of the passengers to inhibit collision of the passengers with each other during an accident;
said housing member comprising a perimeter wall, said perimeter wall defining an interior space of said housing member, said interior space of said housing member comprising an open end such that said open end permits said airbag member to extend from said interior space of said housing member when said airbag member is inflated by said inflation assembly, said inflation assembly being positioned in said interior space of said housing member;
said housing member comprising a lid portion, said lid portion being hingably coupled to said perimeter wall such that said lid portion is positioned adjacent said open end of said housing member, said lid portion being positioned over said open end to inhibit damage to said airbag member when said airbag member is positioned in said interior space of said housing member, said lid portion pivoting away from said open end of said interior space to allow said airbag member to extend from said housing member when said airbag member is inflated by said inflation assembly;
said lid portion of said housing member comprising a shoulder, said shoulder extending around a perimeter of said lid portion such that said shoulder permits a portion of said lid portion to be positioned in said open end of said housing member to inhibit said lid portion from shifting with respect to said perimeter wall of said housing member when said lid portion is positioned over said open end of said interior space;
said inflation assembly comprising a tank member, said tank member being operationally coupled to said airbag member, said tank member being adapted for storing a gas in a compressed state to inflate said airbag member when said inflation assembly is actuated by an impact of the vehicle;
said inflation assembly comprising a valve member, said valve member being operationally coupled between said tank member and said airbag member, said valve member being adapted for being operationally coupled to the vehicle such that said valve member releases the gas from said tank member into said airbag member when said valve member is actuated by the vehicle during an accident; and
said inflation assembly comprising a hose member, said hose member being operationally coupled between said tank member and said airbag member such that said hose member is for providing fluid communication between said tank member and said airbag member.

7. The airbag restraint system as set forth in claim 1, further comprising:
said hose member comprises a length extending between said tank member and said airbag member, said length of said hose member being substantially equal to a length between said tank member and said open end of said housing member such that said hose member permits said airbag member to be positioned above said open end of said housing member when said airbag member is inflated.

* * * * *